United States Patent [19]

Burkus, II et al.

[11] Patent Number: 5,585,451
[45] Date of Patent: Dec. 17, 1996

[54] SILICONE CONDENSATION AND/OR EQUILIBRATION CATALYST AND USE

[75] Inventors: Frank S. Burkus, II; Michael L. White, both of Clifton Park, N.Y.

[73] Assignee: General Electric Company, Schenectady, N.Y.

[21] Appl. No.: 572,366

[22] Filed: Dec. 14, 1995

[51] Int. Cl.⁶ .................................................. C08G 77/06
[52] U.S. Cl. ............................... 528/21; 528/23; 502/158; 502/200; 502/208
[58] Field of Search ................... 528/21, 23; 502/158, 502/200, 208

[56] References Cited

U.S. PATENT DOCUMENTS 2,990,419 6/1961 Nitzsche et al. ........................ 556/401
3,839,388 10/1974 Nitzsche et al. ........................ 528/33

OTHER PUBLICATIONS

Molenberg et al, Macromol. Rapid Commun. 16, 449–453 (1995).

Primary Examiner—Melvyn I. Marquis
Attorney, Agent, or Firm—William H. Pittman

[57] ABSTRACT

A silanol condensation-equilibration catalyst is provided in the form of a mixture of a linear phosphonitrilic chloride and an effective amount of a protic acid having a pKa≦5, such as HCl. A material capable of generating a protic acid in situ during equilibration, such as an organohalosilane, is also effective.

12 Claims, No Drawings

SILICONE CONDENSATION AND/OR EQUILIBRATION CATALYST AND USE

BACKGROUND OF THE INVENTION

The present invention relates to a silicone condensation and/or equilibration catalyst, and its use to effect the condensation or equilibration of silanol containing organopolysiloxanes.

One of the procedures which can be used to equilibrate organopolysiloxanes is based on the use of a linear phosphonitrilic chloride (LPNC) having the formula $$Cl_3P(NPCl_2)_nNPCl_3.PCl_6. \quad (1)$$

where n is 0–4 and preferably 0–2. In addition to compounds shown by formula (1), other LPNC-type materials, such as $Cl_2PONCl_3$, or "PONP", have also have been found to be effective as catalysts. These materials, hereinafter collectively designated "phosphorus-nitrogen chloride", can be made by procedures involving the use of $PCl_5$ and an ammonium salt, as shown by U.S. Pat. No. 3,839,388, incorporated herein by reference. Such phosphorus-nitrogen chlorides can be used as catalysts to intercondense silanol-terminated polydiorganosiloxanes, as well as to equilibrate triorganosiloxy-terminated polydiorganosiloxanes. Mixtures of silanols and diorganosiloxanes having terminal triorganosiloxane units also can be equilibrated with these catalysts. For example, U.S. Pat. No. 2,990,419 shows a method for making organopolysiloxane oils by equilibrating a hydroxy-endblocked diorganosiloxane and a triorganosilyl-endblocked diorganosiloxane using a phosphorous-nitrogen compound, such as a phosphonitrilic halide. In addition, U.S. Pat. No. 3,835,388 shows the use of vacuum in combination with a phosphonitrilic halide as an equilibration catalyst to facilitate the condensation and/or equilibration of silanol fluids. Although effective results can be achieved using these methods, faster catalysts and new procedures are constantly being sought to improve the efficiency of silicone gum manufacture.

SUMMARY OF THE INVENTION

The present invention is based on the discovery that the effectiveness of phosphorus-nitrogen chlorides, such as LPNC's and PONP's, as silanol condensation catalysts can be substantially enhanced if the linear phosphonitrilic chlorides are used in combination with a cocatalyst, such as a strong (pKa≦5) protic acid, for example HCl. A material capable of generating a strong protic acid in the presence of a silanol fluid, such as an organochlorosilane, for example, a methylchlorosilane, also has been found to be an effective cocatalyst.

Thus, there is provided by the present invention a silicone condensation-equilibration catalyst prepared by mixing together about 0.5–100 and preferably about 5–50 parts by weight of a protic acid having a pKa≦5 per part of a phosphorus-nitrogen chloride.

In a further aspect of the invention, there is provided a method for condensing or equilibrating organosiloxane having an average ratio of about 1.9–2.1 organic groups per silicon atom attached to silicon by carbon-silicon bonds, where the organosiloxane has terminal units selected from the group consisting of silanol, $R^1(R^2)2SiO1.5$ and mixtures thereof, where $R^2$ is a monovalent organic radical and $R^1$ is selected from hydrogen and monovalent organic radicals, which comprises agitating at a temperature of about 30°–150° C. a mixture comprising by weight, about 1–1,000 ppm of an equilibration catalyst per 100 parts of organosiloxane, where the equilibration catalyst is prepared by mixing together about 1–100 and preferably about 5–50 parts by weight of a protic acid having a pKa≦5, per part of a phosphorus-nitrogen chloride.

DETAILED DESCRIPTION; PREFERRED EMBODIMENTS

The expression "silanol-containing organosiloxane" as used herein includes polydiorganosiloxane fluids having the formula, $$HO-[Si(R^2)_2-O]_xH, \quad (2)$$

and mixtures thereof with silanol fluids of the formula, $$R^1[(R)_2SiO]_yH, \quad (3)$$

where $R^1$ and $R^2$ are as previously defined and $R^2$ is more particularly a $C_{1-18}$ organic group, and x and y are integers having a value of about 5–10,000 and preferably about 20–1,000. These fluids can have a viscosity in the range of about 5–500,000 centipoise and preferably about 10–100,000 centipoise. The fluids of formula (2) can be made by hydrolyzing a diorganosilane, such as dimethyldichlorosilane, in a controlled amount of water in the presence of a suitable acid or base as catalyst. The silanol fluid of formula (3) can be made by equilibrating a mixture of compounds having triorganosiloxy and diorganosiloxy units. The silanol fluid of formula (3) can contain about 0.02–8.0% hydroxy radicals attached to silicon. Methods for making the silanol fluids of formulas (2) and (3) are shown by U.S. Pat. No. 3,541,044 incorporated herein by reference.

Equilibration of organosiloxane having terminal $R^1(R^2)_2SiO_{1.5}$ units, such as trimethylsiloxy, can be achieved by equilibrating diorganosiloxane cyclics such as octamethylcyclotetrasiloxane with triorganosiloxy-terminated polydiorganosiloxanes such as hexamethyldisiloxane.

Among the organo groups shown for $R^2$ of formulas (2) and (3) there are included, $C_{1-8}$ alkyl radicals, for example methyl, ethyl, propyl and butyl, and haloalkyl radicals such as trifluoropropyl. In addition, $R^2$ can be $C_{1-8}$ alkenyl, such as vinyl and allyl; $C_{3-8}$ cycloalkyl, such as cyclopropyl; and cycloalkenyl such as cyclopentyl. $R^2$ also includes $C_{6-13}$ aryl radicals such as phenyl, tolyl, xylyl and naphthyl as well as haloaryl, for example chlorophenyl. $R^2$ is preferably methyl, vinyl or phenyl.

The equilibration catalyst of the present invention can be made by mixing the phosphorus-nitrogen chloride with a suitable protic acid in the proportions set forth above. LPNC can be made by reacting $PCl_5$ with an appropriate ammonium salt, such as $NH_4Cl$, or $(NH_4)_2SO_4$, in accordance with procedures shown in the aforementioned U.S. Pat. No. 3,839,388. Suitable protic acids are acids having a pKa of 5≦, and include HCl, sulfuric acid, nitric acid, trifluoromethanesulfonic acid, trifluoroacetic acid, acetic acid and formic acid. In addition, materials capable of generating suitable protic acids in situ during equilibration, such as organohalosilanes, for example dimethyldichlorosilane and vinylmethyldichlorosilane, can be used. Although the equilibration catalyst can be used directly to equilibrate silanol-containing organosiloxanes, it is preferred to employ it as a solution in a suitable inert organic solvent such as methylene chloride, or in combination with a silicone oil, such as a polydimethylsiloxane.

The condensation or equilibration reaction can be effected by maintaining a mixture of the organosiloxane and an effective amount, typically about 1–200 ppm by weight, of the equilibration catalyst at a temperature in the range of about 20°–150° C., optionally in the presence of an inert organic solvent, to produce a mixture having about 10–90% by weight solids. Suitable inert organic solvents include aromatic hydrocarbons such as toluene and aliphatic hydrocarbons such as mineral spirits, hexane, and heptane. The mixture can be agitated, for example stirred and refluxed, for a period of about 0.5–12 hours. Termination of the reaction can be monitored by proton and Si—29 nuclear magnetic resonance spectroscopy. Product recovery can be achieved by pouring the reaction into a precipitating solvent, such as methanol, followed by filtration or centrifugation.

The invention is illustrated by the following examples. All parts are by weight unless otherwise indicated.

EXAMPLE 1

A mixture of $PCl_5$ and $(NH_4)_2SO_4$, in a 3:1 molar ratio, was heated for several hours in refluxing chlorobenzene. Rotary evaporation of the solvent and vacuum distillation resulted in pure $Cl_2PONCl_3$ (PONP), as shown by 31P NMR. A 0.50% solution of the PONP was made by dissolving it in methylene chloride which had been dried over $P_2O_5$.

Catalyst activity was measured by adding 100 ppm of the catalyst to 125 g of a silanol-terminated polydimethylsiloxane having a viscosity of 3500 centipoise while it was stirring at a temperature of 30° C. The reaction mixture was stirred for 15 sec and then placed on a Brookfield LV viscometer to determine the change in viscosity. Viscosity changes of the reaction mixture in the range of 3,000–100,000 centipoise were recorded over various time intervals.

A plot of the natural logarithm of the viscosity versus time was used to analyze the data. The slope of the plot, corresponding to change in viscosity, was 0.008 for the PONP catalyst alone, while 100 ppm of HCl as a 1N solution in ethyl ether resulted in a slope of substantially less than 0.001, corresponding to essentially no viscosity build.

The procedure was repeated to evaluate a mixture of the PONP catalyst and HCl. The HCl was employed in ethyl ether over a range of 1–50 molar equivalents to provide a range of about 5–50 parts of HCl per part of PONP in the resulting mixture. It was found that the slopes of the resulting plots varied from 0.009 to 0.039 based on the amount of added HCl.

An LPNC catalyst within the scope of formula 1 was then evaluated following the above procedure with additional protic acids having pKa values of $\leq 5$. With 30 molar equivalents of HCl, the catalyst plot had a slope of 0.035. When 4 molar equivalents of acetic, trifluoroacetic, and formic acids were used, the slopes were 0.012 for each while trifluoromethanesulfonic acid produced a slope of 0.017.

The above results show that a superior silanol condensation catalyst can be obtained by combining a phosphorus-nitrogen chloride catalyst with about 5–50 parts of a protic acid having a pKa of $\leq 5$.

EXAMPLE 2

A 4% catalyst solution was prepared by adding 9.4 mL of methylene chloride (dried over $P_2O_5$) to a solution of 0.40 g of PONP in 0.63 mL of dichlorodimethylsilane (a 3.5× molar excess relative to PONP). Following the procedure of Example 1, 100 ppm of the catalyst was added to 125 g of the silanol-terminated polydimethylsiloxane. The slope of the plot was found to be 0.031, which was a significant increase over the PONP catalyst alone.

EXAMPLE 3

At 90° C., an effective amount of a catalyst mixture of PONP and dimethyldichlorosilane was added to 0.57 g of a trimethylsiloxy-terminated polydimethylsiloxane having an average of six dimethylsiloxy units per molecule and containing 9.2% dodecane. Sufficient catalyst was used to provide 100 ppm of PONP and a 3.5 molar excess of dimethyldichlorosilane based on PONP.

The mixture was allowed to stand for 30 minutes at 90° C. prior to being analyzed by GC. Complete redistribution resulted, as shown by the production of a mixture having an equilibrium amount of the original polydimethylsiloxane along with trimethylsiloxy-terminated polydimethylsiloxane having a broad molecular weight range.

EXAMPLE 4

A phosphorus-nitrogen chloride was prepared by the reaction in a nitrogen atmosphere of 397 mmol of $PCl_5$ with 302 mmol of $NH_4Cl$ in tetrachloroethane as solvent, precipitated with hexane and dissolved in methylene chloride at a concentration of 4.49 g/150 mL.

Mixtures of equal weights of a vinyl-terminated polydimethylsiloxane and a polydimethylsiloxane containing both terminal and internal vinyl groups, having a viscosity of about 9200 centipoise, were combined with various proportions of trifluoromethanesulfonic acid and the phosphorus-nitrogen chloride solution was added to a level of 30 ppm by weight of phosphorus-nitrogen chloride. The viscosities of the mixtures were measured as described in Example 1. After 25 minutes, the viscosities were approximately as follows:

No acid—220 centipoise;
25.5 ppm acid—120 centipoise;
51.0 ppm acid—80 centipoise;
76.5 ppm acid—50 centipoise.

Thus, the catalysts of the invention produce substantially more rapid equilibration than the acid-free catalyst.

What is claimed is:

1. A silicone condensation-equilibration catalyst prepared by mixing about 0.5–100 parts by weight of a protic acid having a pKa$\leq$5 with 1 part of a phosphorus-nitrogen chloride.

2. A catalyst in accordance with claim 1 wherein about 5–50 parts of said protic acid is employed per part of said phosphorus-nitrogen chloride.

3. A catalyst in accordance with claim 1 where the phosphorus-nitrogen chloride is a linear phosphonitrilic chloride.

4. A catalyst in accordance with claim 1 where the linear phosphorus-nitrogen chloride is $Cl_3PNPOCl_2$.

5. A catalyst in accordance with claim 1 where the protic acid is HCl.

6. A catalyst in accordance with claim 1 where the protic acid is generated in situ from an organohalosilane.

7. A catalyst in accordance with claim 6 where the organohalosilane is dimethyldichlorosilane.

8. A method for condensing or equilibrating organosiloxane having an average ratio of about 1.9–2.1 organic groups per silicon atom attached to silicon by carbon-silicon bonds, where the organosiloxane has terminal units selected from the group consisting of silanol, $R^1(R^2)2SiO1.5$ and mixtures thereof, where $R^2$ is a monovalent organic radical and $R^1$ is selected from hydrogen or a monovalent organic radical, which comprises agitating at a temperature of about 30°–150° C. a mixture comprising by weight, about 1–1,000 ppm of an equilibration catalyst per 100 parts of organosiloxane, where the equilibration catalyst is prepared by mixing together about 0.5–100 parts by weight of a protic acid having a pKa$\leq$5, per part of a phosphorus-nitrogen chloride.

9. A method in accordance with claim 8 wherein about 5–50 parts of said protic acid is employed per part of said phosphorus-nitrogen chloride.

10. A method in accordance with claim 8 where the silanol-containing organosiloxane is a polydiorganosiloxane fluid having the formula $$HO-[Si(R^2)_2-O]_xH,$$

or a mixture thereof with a silanol fluid of the formula $$R^1[(R^2)_2SiO]_yH,$$

where x and y are integers having a value of about 5–10,000 and $R^2$ is a $C_{1-18}$ organic group.

11. A method in accordance with claim 8 where the silanol-containing organosiloxane is a silanol-containing methylsiloxane.

12. A method in accordance with claim 8 where the organosiloxane is a trimethylsiloxy-terminated polydimethylsiloxane.

* * * * *